United States Patent [19]
Wohlenberg et al.

[11] Patent Number: 5,875,634
[45] Date of Patent: Mar. 2, 1999

[54] PYROTECHNICAL DRIVE DEVICE WITH PRESSURE RELIEF

[75] Inventors: Jörn Wohlenberg, Hamburg; Matthias Steinberg, Elmshorn, both of Germany

[73] Assignee: Autoliv Development AB, Vargarda, Sweden

[21] Appl. No.: 761,677

[22] Filed: Dec. 6, 1996

[30] Foreign Application Priority Data

Dec. 8, 1995 [DE] Germany ............ 195 45 795.1

[51] Int. Cl.⁶ .................................. F01B 29/08
[52] U.S. Cl. .............................. 60/632; 242/374
[58] Field of Search ............... 60/632, 638; 242/374

[56] References Cited

U.S. PATENT DOCUMENTS 5,450,723  9/1995  Föhl .......................... 60/638

FOREIGN PATENT DOCUMENTS 3903148  8/1990  Germany .

*Primary Examiner*—Noah P. Kamen
*Attorney, Agent, or Firm*—Robert W. Becker & Associates

[57] ABSTRACT

A pyrotechnical drive device for a safety tensioning device has a guide tube and a drive element movably mounted within the guide tube. A receiving member is connected to the guide tube. A gas generator for producing a gas when activated is provided. The gas drives the drive element within the guide tube. The gas generator includes a sleeve and is mounted with the sleeve within the receiving member. The receiving member has a wall with an opening and the opening has a size adapted to the wall thickness material of the sleeves such that, when a pressure load limit of the gas generated within the sleeve is surpassed upon activation of the gas generator, the sleeve is pressed into the opening and bursts open.

3 Claims, 1 Drawing Sheet

PYROTECHNICAL DRIVE DEVICE WITH PRESSURE RELIEF

BACKGROUND OF THE INVENTION

The invention relates to a pyrotechnical drive for a safety device such as a tensioning device of a safety belt etc. It includes a drive element movable within a guide tube and a gas generator positioned within a receiving member attached to the guide tube. The gas generator is activatable under certain conditions for generating a gas that acts on the drive element in order to move it within the guide tube.

A pyrotechnical drive device with the aforementioned features is, for example, known from German Patent 39 03 148. Such drive devices are especially used for tensioning devices of safety belts which act on the safety belt itself or effect a tensioning movement of an anchoring part for a safety belt lock or act with a suitable coupling onto the safety belt reeling shaft of a coordinated safety belt reeling device. In the aforementioned German Patent 39 03 148 the drive device for a tensioning device acts on the safety belt reeling shaft. The known drive device comprises at one end thereof a cylinder as a receiving member for receiving the gas generator. The gas generator in case of activation releases the gas that drives a piston arranged within the cylindrical guide tube. The piston acts as the drive element.

The aforementioned drive device has the disadvantage that when the piston jams within the guide tube, excessive pressure will build up in the portion of the guide tube positioned between the piston and the gas generator. This may result in a destruction of the guide tube, respectively, of the receiving member for the gas generator and may result in detachment and ejection of parts at the location of rupture.

It is therefore an object of the present invention to improve a drive device of the aforementioned kind such that an effective pressure relief valve is provided that can be manufactured easily.

SUMMARY OF THE INVENTION

The pyrotechnical drive device for a safety tensioning device according to the present invention is primarily characterized by:

A guide tube;
A drive element movably mounted within the guide tube;
A receiving member connected to the guide tube;
A gas generator for producing a gas when activated, the gas driving the drive element within the guide tube;
The gas generator including a sleeve and being mounted with the sleeve within the receiving member.

The receiving member has a wall with an opening. The sleeve has a given material and thickness that, incombination with a particularly sized receiving member opening, will rupture at a predetermined pressure from the gas generator. The sleeve will burst outward through the opening.

The receiving member and the guide tube may be integral.

The gas pressure responsive drive element may be a piston or at least one ball with a corresponding coupling onto a safety belt reeling shaft, as is known in the art.

The invention has the advantage that the providing an opening within the receiving member and a sleeve that are adapted with regard to size, respectively, material and wall thickness to one another, a pressure relief valve for releasing excessive pressure is provided that acts only within a defined area, i.e., in the area of the opening within the receiving member. The sleeve accordingly opens only within the area of the opening and an uncontrolled bursting of the guide tube and thus ejection of part is prevented. The simplicity of the invention enables low cost and easy manufacture.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of a specific embodiment utilizing FIGS. 1 and 2.

Figure 1:
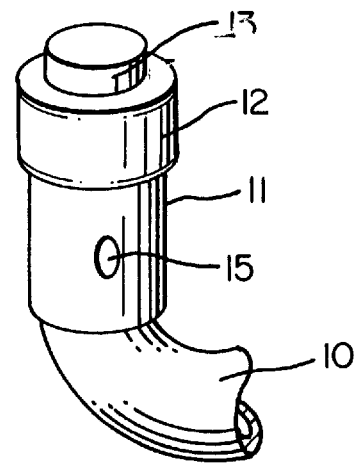
FIG. 1 is a partial view of a drive device with the end of the guide tube having arranged thereat the receiving member.
Figure 2:
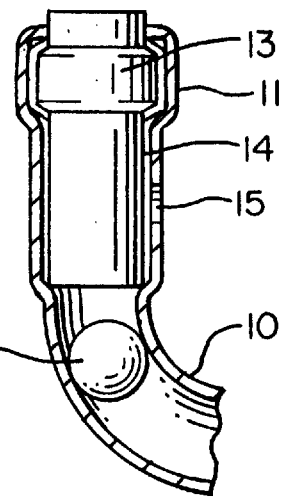
FIG. 2 shows the device of FIG. 1 in a sectional view.
Figure 3:
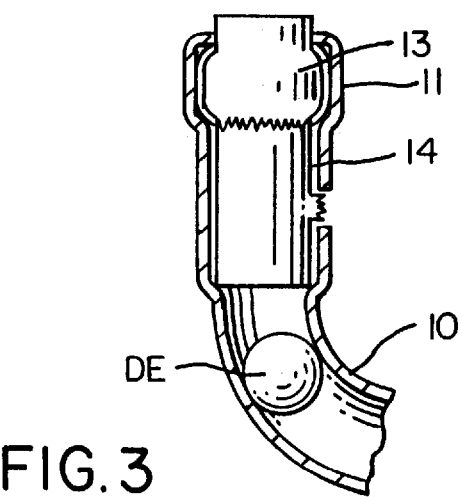
FIG. 3 shows the drive device after deployment of the gas generator and of the pressure relief valve.

FIG. 1 shows the end of the guide tube 10 which is provided with a receiving member 11 as a unitary part. In a widened portion 12 of the receiving member 11 the gas generator 13 is arranged and secured.

As can be seen in detail in FIG. 2, the gas generator 13 is connected to a sleeve 14 positioned within the widened portion 12 of the guide tube 10 such that the gases released by the gas generator 13 will first flow through the sleeve 14 and will subsequently enter the guide tube 10 then to act on drive element DE.

The wall of the gas generator receiving member 11 has an opening 15 which in the mounted position of the gas generator is closed off by the sleeve 14. The dimensions (size) of the opening 15 within the wall of the receiving member 11 and the wall thickness, respectively, the material of the sleeve 14 are matched such relative to one another that, when a predetermined pressure load limit is surpassed, the sleeve 14 is deformed (forced) into the opening 15 by the gas pressure until the sleeve 14 will open (burst) within the area of the opening 15. The gas is vented to the atmosphere when the sleeve ruptures in response to excessive pressures to prevent damage to the safety tensioning device.

The present invention is, of course, in no way restricted to the specific disclosure of the specification and drawings, but also encompasses any modifications within the scope of the appended claims.

What we claim is:

1. A pyrotechnical drive device for a safety tensioning device, said pyrotechnical drive device comprising:
   a guide tube;
   a drive element movably mounted within said guide tube;
   a receiving member connected to said guide tube;
   a gas generator for producing a gas when activated, the gas driving said drive element within said guide tube;
   said gas generator including a sleeve and being mounted within said sleeve within said receiving member;

said receiving member having a wall with an opening, said opening having a size adapted to a wall thickness and material of said sleeve such that, upon surpassing a preset pressure limit of the gas generated within said sleeve when said gas generator has been activated, said sleeve is pressed into said opening and bursts open.

2. A pyrotechnical drive device according to claim 1, wherein said receiving member and said guide tube are a unitary part.

3. A pyrotechnical drive device according to claim 1, wherein said drive element is a piston.

* * * * *